United States Patent Office 3,201,093
Patented Aug. 17, 1965

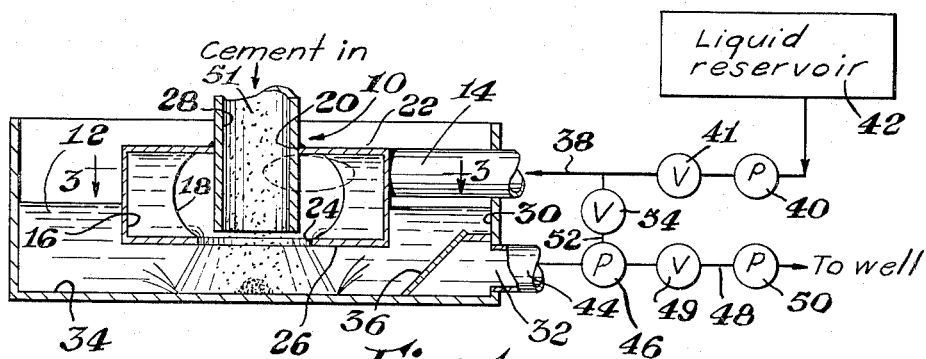

3,201,093
MIXING APPARATUS
Alan G. Smith, Tulsa, Okla., assignor to The Dow Chemical Company, Midland, Mich., a corporation of Delaware
Filed Apr. 10, 1962, Ser. No. 186,547
9 Claims. (Cl. 259—4)

This invention relates to apparatus for mixing particulate solid material with a liquid containing medium, and particularly to cement mixing apparatus.

In oil and gas well (or other earth well) cementing service, it is necessary to provide cement mixers which will rapidly prepare large quantities of neat cement at a predetermined density. The neat cement is then pumped into the well being treated.

Paddle type mixers and so-called jet mixers are commonly used in preparing neat cement for use in well cementing service. Paddle type mixers do an excellent job of mixing but require a mixing tank having a relatively large volume. Since the tank and mixer must be transported from well to well, the bulk and weight make this type of mixing equipment somewhat expensive to use as compared to lighter, less bulky equipment. Further, when thick slurries are mixed, the equipment operator must be careful not to permit the paddles to stick. In addition, cleanup of the equipment after use can be a practical problem when this type of mixer is used.

Jet type mixers function well in making ordinary cement slurries, but the adequate mixing of gel cements has proven difficult with a jet type mixer. Also, the jet mixer usually requires the use of one of the treating pumps to drive the jet, decreasing the capacity of the treating truck of actually pump cement into the well.

Accordingly, a principal object of this invention is to provide an improved mixing apparatus.

Another object of this invention is to provide an improved mixing apparatus which requires a relatively small amount of energy to operate it as compared with prior art devices of similar mixing capacity.

A further object of this invention is to provide a lighter, more compact apparatus for use in mixing neat cement and the like.

A different object of this invention is to provide an improved, high capacity, easy to clean, mixing device for use in earth well treating applications.

Still another object of this invention is to provide an improved apparatus for preparing neat cement which is economical to make, has a high mixing capacity, is easy to clean, and is trouble free in operation.

In accordance with this invention, there is provided a vortex forming chamber which is generally cylindrical in configuration and which has an inlet in its wall for directing a stream of pumpable fluid more or less tangentially along the side wall of the chamber. The bottom or discharge end of the chamber has a coaxial discharge bore through which fluid from the induced vortex escapes. The top or inlet end of the chamber has a coaxial cement inlet bore which is of smaller diameter than the discharge bore.

A baffle plate, which may be the bottom of a cement reservoir tank in some instances, is usually positioned between ½ and 6 inches, or between about $\frac{1}{10}$ and 1.5 times the discharge bore diameter, below the discharge bore, the baffle plate being disposed transverse to the longitudinal axis of the chamber whereby fluid escaping from the swirling vortex impinges on the baffle plate after leaving the chamber.

If a recirculation through the vortex chamber of the cement-fluid mixture produced in a single "pass" is needed to make a slurry of high specific gravity, the output of the mixer may be discharged into a tank and all or part of the output recirculated through the vortex chamber.

The cement enters the hollow space in the so-called eye of the vortex in the chamber and falls onto or near to the baffle plate before it is swept into the escaping swirling fluid from the vortex and intimately mixed therewith.

The cement may be poured or blown into the "eye" of the vortex, and the entry means may be the entry bore or a pipe which extends into or even through the chamber (but terminating above the baffle plate).

The invention, as well as additional objects and advantages thereof, will best be understood when the following detailed description is read in connection with the accompanying drawing, in which:

FIG. 1 is a side elevational view, in section, of mixing apparatus disposed in an inventory tank with pumping means coupled thereto to show the manner of using the apparatus in treating an earth well;

FIG. 2 is a plan view of mixing apparatus of FIG. 1;

FIG. 3 is a sectional view taken along the line 3—3 of FIG. 1;

FIG. 4 is a side elevational view, in section, of an alternative embodiment of this invention; and FIG. 5 is a side elevational view, in section, of a further alternative embodiment of this invention.

Referring to the drawing, particularly to FIGS. 1, 2 and 3, there is shown cement mixing apparatus, indicated generally by the number 10, which comprises a generally cylindrically shaped chamber 12 having an inlet 14 for pumpable liquid or slurry. The inlet 14 is so disposed that material pumped through it into the chamber 12 is directed more or less tangentially along the inner peripheral surface 16 of the chamber, the swirling mass forming a vortex 18 within the chamber.

The chamber 12 has a bore 20 in its upper or input end 22, and a bore 24 in its lower or output end 26. The bores 20 and 24 are coaxial with respect to each other and with respect to the longitudinal axis of the chamber. The bore 24, which is the outlet bore, being larger in diameter than the cement inlet bore 20.

An inlet pipe 28 extends through the bore 20 and near to the bottom 26 of the chamber 12, the pipe 28 being coaxial with the longitudinal axis of the chamber. As shown, the pipe 28 is rigidly secured to the top of the chamber.

The chamber 12, as shown in FIG. 1, is disposed within an inventory tank 30 which has an outlet bore 32 near the bottom 34 of the tank and which extends through the side wall of the tank. A baffle plate 36 is disposed in the tank 30 near the bore 32 to prevent excessive flow of slurry from any one part of the tank 30 to the outlet bore.

The chamber 12 is so-disposed that its outlet end 26 is spaced from the bottom 34 of the tank 30, the tank bottom serving as a baffle plate to disperse and deflect material from the vortex 18 which escapes through the outlet bore 24 in the bottom 26 of the chamber 12.

The inlet 14 of the chamber is connected through a line 38 and pump 40 to a reservoir 42 or other source of liquid such as water, for example.

The outlet bore 32 of the tank is coupled through the line 44, a pump 46, line 48, valve 49 and booster pump 50 to the well, not shown, which is to be treated. The output of the pump 46 is also coupled through a line 52 and valve 54 to the pump 40 and the inlet 14 of the chamber 12.

The inlet pipe 28, through which cement is introduced into the apparatus may be coupled to a metering hopper (not shown) into which cement may be loaded or to a pneumatically operated cement distribution line (not shown).

In operation, liquid is usually, but not necessarily, pumped from the reservoir 42, by means of the pump 40 through valve 41 and line 38, into the tank 30 through the chamber 12 until the tank is about half full of liquid or at least until the liquid rises above the bottom 26 of the chamber 12 before cement 51 (shown as particles) is introduced into the apparatus 10.

Then, with the valve 49 closed and valve 54 open, liquid from the tank 30 is pumped back into the chamber 12 through the inlet 14 as particulated cement 51 is introduced through the pipe 28. The liquid enters the chamber 12 at sufficient pressure to produce a swirling vortex 18 therein, the swirling water which cannot be contained in the chamber being dispersed outwardly in sheet-like form, impinging on the bottom 34 of the tank and being deflected therefrom. The cement enters the "eye" of the vortex 18 and is blown, falls or is drawn towards the bottom 34 of the tank 30 where is is swept into the swirling water or slurry which impinges on the tank bottom. The violent shearing action as the swirling water from the vortex 18 hits the tank bottom 34 and the other liquid or slurry and the resulting turbulance causes intimate mixing of the cement with the water at a rapid rate.

Once the inventory of slurry in the tank has reached a suitable density, the valve 41 is at least partially opened and more water from the reservoir is introduced to continue forming a vortex, cement is continually introduced into the device and slurry is pumped through the now at least partially opened valve 49 to the well under treatment.

It is, of course, practical to introduce cement into the apparatus 10 as soon as enough water passes through the chamber 12 to form a vortex, as the apparatus will function as a cement mixer even though there is no liquid inventory in the tank 30.

While slurries of relatively low density may be formed in one "pass" of liquid through this apparatus, slurries of high density are formed by recirculating some of the tank inventory through the vortex chamber along with additional water which is introduced into the chamber. The versatility of the apparatus is such that slurries so viscous that they barely can be pumped can be made, yet the mixing is apparently complete due to the turbulence and shearing action produced by the water (or recirculated slurry and water mixture) from the vortex 18 escaping from the chamber 12 and impinging on the bottom of the tank (which is a substitute for a baffle plate).

The apparatus shown in FIG. 4 is generally the same as shown in FIG. 1, except that a baffle plate 56 other than the bottom of a tank is illustrated and the cement entry pipe 28a is disposed slightly above the top end of the chamber 12a. With the baffle plate disposed below the chamber, there need be no fixed dimensional relationship between the chamber and the bottom of a tank, or even that the chamber be disposed in a tank.

It has been found that the device, in operation, seems to partially evacuate the "eye" or liquid free part of the vortex 18a and swirling fluid below the chamber, and that particulated cement entering through the pipe 28a is drawn down the "eye" with substantially none of it mixing into the swirling liquid slurry until it is at least near to the place where the liquid or slurry impinges on the baffle plate 56 or the bottom of the tank.

Because the exit or discharge bore 24a is larger by 40 percent to 120 percent in diameter than is the cement entry bore 20a, the water or slurry from the vortex 18a escapes through the bore 24a before reaching the edge of the bore 20a.

The apparatus shown in FIG. 5 has a short down pipe 58 surrounding the outlet bore 24b and a baffle plate 60 which is disposed transversely but not perpendicular with respect to the common longitudinal axis of the chamber 12b and down pipe 58. In this embodiment the cement entry tube or pipe 28b extends through the chamber 12b and into the down pipe 58, but is above the lower end 62 of it.

In the apparatus illustrated in FIG. 5, the cement entry tube 28b is not rigidly coupled to the chamber 12b, but is fitted loosely through the bore 20b which is smaller in diameter than is the bore 24b.

In this embodiment, the swirling water or slurry escaping from the vortex 18b continues swirling at a rapid rate as it passes down the down pipe 58 and then disperses in the same manner as described in connection with water leaving the chamber 12 in FIG. 1.

Although having a down pipe coupled to the apparatus results in some energy loss due to friction, the down pipe is useful were the vortex forming chamber part of the apparatus must be disposed near the top of a tank where it is more accesible for coupling a water line to it, for example, than would be the case if the apparatus were disposed deep within a tank, for example.

It should be realized that apparatus of the type shown in FIG. 1 may be started and operated while it is completely submerged. When liquid is pumped into the chamber 12, setting up the vortex, sufficient vacuum will be created under usual conditions to clear the cement pipe 28 of any liquid. Thus cement entering the equipment will, as usual, fall through the "eye" of the vortex and be affected as previously described in connection with FIG. 1. If the cement is pneumatically driven into the "eye" of the vortex, the apparatus will function because the water or other liquid in the cement entry tube will be blown out even if the vacuum created by the vortex is not by itself able to clear the cement entry tube of liquid.

In one appartus made in accordance with this invention, the diameter of the vortex forming chamber is 16 inches, the diameter of the outlet or vortex discharge bore is 6 inches and the outer diameter of the cement entrance pipe and the height of the chamber are both 5 inches. The liquid or slurry entry pipe coupled to the vortex forming chamber is 5 inches in outer diameter. The baffle plate was spaced about 5 inches below the vortex discharge bore.

Water was pumped into the vortex forming chamber to fill the tank half full and then was circulated at a rate of approximately 20 barrels per minute as cement was applied to the device until the slurry reached the desired density of 14.4 pounds per gallon. This took about 30 seconds (75 gallons of water filled the tank half full).

The slurry was then pumped from the tank to the well under treatment at a rate as high as 15 barrels per minute, the flow of dry cement and water (including recirculated slurry) into the apparatus being adjusted to maintain the inventory in the tank at the same approximate level (half full and above the vortex discharge bore in this instance).

Two thousand seven hundred and ten gallons of 16 percent gel cement slurry were prepared in four minutes in the operation described above. The quantity of ingredients making up the slurry were 169 sacks (15,886 pounds) API Class A Portland cement, 27 sacks (2,538 pounds) bentonite, and 1,960 gallons of water (750 gallons equals the volume occupied by the cement and bentonite).

There were no bentonite lumps in the slurry such as are often present following conventional mixing procedures.

In another well treatment in which equipment of the type described in the above example was used, 800 sacks of API Class A Portland cement were used. On filling the inventory tank half full and building the slurry up by recirculating as described before, a cement slurry having a density of about 14 pounds per gallon was pumped into the well at a mixing rate equivalent to 33 sacks (94 lbs. each) of dry cement per minute. Between 5 and 7 gallons of water are mixed with each sack of Portland cement to attain the slurry density set forth in this treatment.

In yet another well treatment 376 pounds of calcium chloride, 500 sacks of Portland cement, 300 sacks of Litepoz No. 1 cement and 2 percent (by dry weight) of bentonite were mixed at a rate equivalent to 33 cubic feet of dry particulate material per minute with water in the amount of 5 to 8 gallons per cubic foot of dry material, the circulation rate (including recirculated slurry) in the apparatus during the mixing being 20 to 25 barrels per minute.

A further well treatment was made in which 225 sacks of Portland cement and 75 sacks of Litepoz No. 1 cement were mixed with water in the amount of 7 to 10 gallons per cubic foot of dry material to produce a slurry having a density of approximately 13.2 pounds per gallon. The slurry pumping rate to the well was equivalent to 21 cubic feet per minute of dry particulate material. Again, the circulation rate (including recirculated slurry) through the apparatus was 20 to 25 barrels per minute.

In still another well treatment in accordance with this invention, 25 sacks of Portland cement were mixed with water in the amount of 5 gallons of water per sack of cement to produce a slurry having a density of about 15 pounds per gallon. Then, continuing to mix slurry, 25 sacks of Portland cement having 12 percent by weight of bentonite added thereto were mixed with water in the amount of 10 gallons per sack of dry mixture to produce a slurry having a density of about 12.5 pounds per gallon. The circulation rate (including recirculated slurry) through the apparatus is about 20 to 25 barrels per minute and the pumping rate to the well of mixed slurry for this treatment was equivalent to 5 to 6 sacks per minute of dry cement material.

While the above examples are illustrative of the manner of operating the apparatus of this invention, it has been found that the apparatus operates effectively over a wide range of operating conditions. For example, the above apparatus has, on test, mixed slurry when the cement feeding rate to the apparatus was 5,000 pounds per minute. While the rate at which water is introduced to the vortex forming chamber may vary, a back pressure of 25 to 35 pounds per square inch on the 5 inch diameter input line, 30 pounds being the "normal" pressure for most mixing operations, has proven satisfactory in the apparatus described in the above example.

The amount of pressure needed in the inlet pipe is a function of the diameter of the inlet pipe as well as of the diameter of the outlet bore. When a large diameter outlet bore is used, more energy must be applied to the vortex to provide the swirling water or slurry escaping from the vortex with the same energy per unit volume as is the case with the water or slurry where small diameter chambers and outlet bores are used.

In another embodiment of the apparatus of this invention which is especially adapted for use with bagged cement rather than bulk cement, the diameter of the vortex forming chamber is 20 inches, the diameter of the cement slurry entry pipe (or bore) is 10 inches and the diameter of the vortex discharge bore is 12 inches. With a liquid and slurry circulation rate through the vortex chamber at a rate of 20 to 25 barrels per minute, the apparatus mixes 20 to 25 bags of cement per minute into slurry having a density of 14 to 15 pounds per gallon.

When the apparatus having a 20 inch diameter vortex chamber is also operative when bulk cement is fed into it, the mixing rate for bulk cement is not appreciably higher than when sack cement is fed through the apparatus. Mixing rate apparently is a function of the rotational velocity of the vortex, and the circulation rate of 20 to 25 barrels per minute of pumpable mixture exiting from a 12 inch diameter bore in a 20 inch diameter chamber produces less velocity than when a 6 inch diameter exit bore is used in a 16 inch diameter vortex forming chamber.

In the "sack cement" mixing apparatus described above the exit bore is only 2½ inches above the baffle plate, rather than about 6 inches or so away as in the other described embodiments. Again, an increase in velocity of the vortex would permit greater spacing of the exit bore from the baffle plate.

While the apparatus of this invention has primarily been described in connection with the mixing of cement base slurries, it is also adaptable for use in mixing drilling mud slurries and the like. The circulation rate through the chamber, the diameter of the chamber and of the exit bore, the spacing of the baffle plate with respect to the exit bore, and the rate of feeding particulate material into the "eye" of the vortex may be determined by trial for specific equipment.

What is claimed is:

1. Slurry mixing apparatus comprising a vortex forming chamber, said chamber having a top, a bottom, and a generally circular inner peripheral wall, pumpable material inlet means, said means communicating with said wall and having a flow axis which is disposed generally in tangential alignement with respect to the inner peripheral wall, a particulate material inlet bore, said bore being coaxial with the longitudinal axis of said chamber, and extending through the top of said chamber, a particulate materials inlet pipe, said pipe being aligned with and extending through said inlet bore and into said chamber, a vortex discharge bore, said bore being coaxial with the longitudinal axis of the chamber and extending through the bottom of said chamber, said discharge bore being larger in diameter than said inlet bore, and baffle means, said baffle means a member having a flat plate-like surface disposed at a distance of between one-half inch and the diameter of said discharge bore from the bottom of said chamber below said discharge bore and in the path of pumpable material escaping from a vortex within said chamber.

2. Apparatus in accordance with claim 1, wherein said pipe terminates above said discharge bore.

3. Apparatus in accordance with claim 1, wherein said pipe terminates below said discharge bore but above said baffle plate.

4. Apparatus in accordance with claim 1, wherein said chamber is disposed in a predetermined relationship with respect to a tank which has a bottom, the bottom of the tank functioning as said baffle means.

5. Apparatus in accordance with claim 4, wherein pumping means are provided for discharging slurry from said tank and for recirculating at least a part of said slurry to said pumpable material inlet means.

6. Apparatus in accordance with claim 1, wherein means for pumping liquid into said inlet means are provided.

7. Apparatus in accordance with claim 1, wherein the diameter of said inlet means is between 40 percent and 120 percent of the diameter of the discharge bore.

8. Apparatus in accordance with claim 1, wherein said inlet pipe is sealed to said inlet bore.

9. Apparatus in accordance with claim 1, wherein a down pipe surrounds and extends downwardly from said discharge bore.

References Cited by the Examiner

UNITED STATES PATENTS

| 1,680,678 | 8/28 | Halliburton | 259—147 |
| 2,528,514 | 11/50 | Harvey et al. | 259—4 X |
| 2,664,277 | 12/53 | Davies | 259—161 |
| 2,915,412 | 12/59 | Lyons | 259—161 X |

FOREIGN PATENTS

| 815,247 | 4/37 | France. |
| 1,031,766 | 6/58 | Germany. |

WALTER A. SCHEEL, *Primary Examiner.*